United States Patent
Libsch et al.

(10) Patent No.: US 6,181,398 B1
(45) Date of Patent: *Jan. 30, 2001

(54) MULTIPLE PIXEL DRIVEN MIRROR ELECTRODES FOR IMPROVED APERTURE RATIO OF REFLECTIVE DISPLAYS

(75) Inventors: Frank R. Libsch, White Plains; Kei-Hsiung Yang, Katonah; James Lawrence Sanford, Chappagua, all of NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/146,713

(22) Filed: Sep. 3, 1998

(51) Int. Cl.[7] .................................................. G02F 1/136
(52) U.S. Cl. ............................ 349/113; 349/38; 349/47
(58) Field of Search .......................... 349/43, 42, 47, 349/44, 38, 39, 111, 113

(56) References Cited

U.S. PATENT DOCUMENTS

| 4,231,640 | 11/1980 | Funada et al. . | |
| 4,335,936 | 6/1982 | Nonomura et al. . | |
| 4,449,123 | 5/1984 | Muranaga . | |
| 5,321,535 | * 6/1994 | Ukai et al. | 349/85 |
| 5,365,355 | * 11/1994 | Hastings, III et al. | 349/42 |
| 5,461,501 | * 10/1995 | Sato et al. | 349/42 |
| 5,706,067 | * 1/1998 | Colgan et al. | 349/114 |
| 5,805,252 | * 9/1998 | Shimada et al. | 349/113 |
| 5,978,056 | * 11/1999 | Shintani et al. | 349/137 |

FOREIGN PATENT DOCUMENTS

| 917164 | 3/1982 | (BG) . |
| 64-10217 | 1/1989 | (JP) . |
| 64-10218 | 1/1989 | (JP) . |
| 3-282518 | 12/1991 | (JP) . |
| 6-95140 | 4/1994 | (JP) . |
| 7-64110 | 3/1995 | (JP) . |
| 10-82995 | 3/1998 | (JP) . |
| 10-104658 | 4/1998 | (JP) . |

* cited by examiner

Primary Examiner—Kenneth Parker
(74) Attorney, Agent, or Firm—Scully, Scott, Murphy & Presser; David M. Shofi, Esq.

(57) ABSTRACT

An LCD reflection display array implementing two or more layers of reflecting front surface mirrors with an upper layer mirror(s) having absorbing back surface(s). The mirror surfaces associated with each pixel are electrically connected to the pixel output electrode. The lower mirrors are appropriately positioned in the three dimensions to achieve nearly 100% aperture fill.

12 Claims, 7 Drawing Sheets

Fig. 8 ered in the normally black mode where λ is the
MULTIPLE PIXEL DRIVEN MIRROR ELECTRODES FOR IMPROVED APERTURE RATIO OF REFLECTIVE DISPLAYS

BACKGROUND OF THE INVENTION

1. Field of the Invention

The present invention relates generally to the field of reflective array display devices, and, more particularly, to a novel reflective array structure that provides a novel multi-mirror structure for maximizing aperture ratio while minimizing optical power absorption.

2. Discussion of the Prior Art

In transmissive or reflection display arrays, it is desirable to have the aperture ratio of the cell as high as possible to minimize the amount of illumination required and optical power absorption by the array. A better display results from higher brightness and efficiency.

Figure 1:
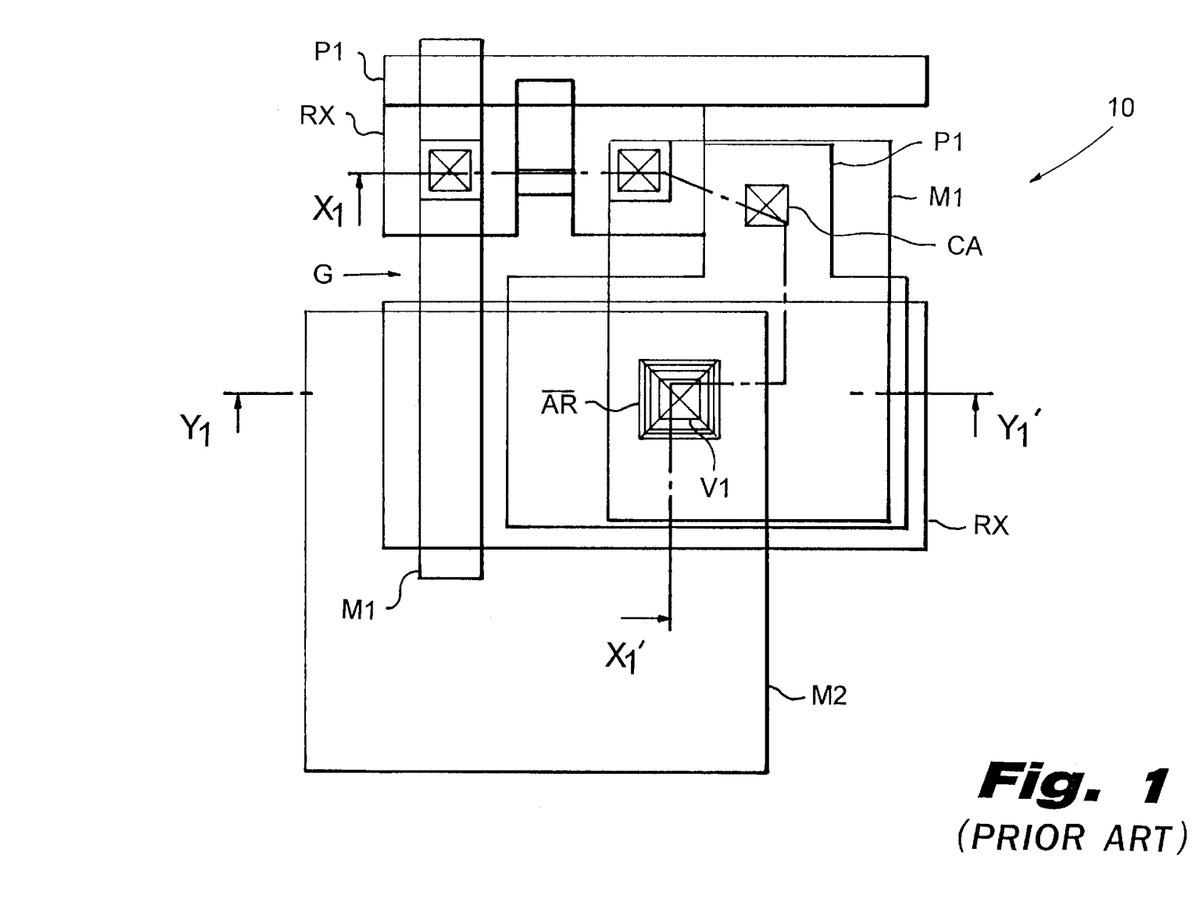
FIG. 1 illustrates the physical layout of an existing absorbing gap cell for a LCD reflection display.
Figure 2:
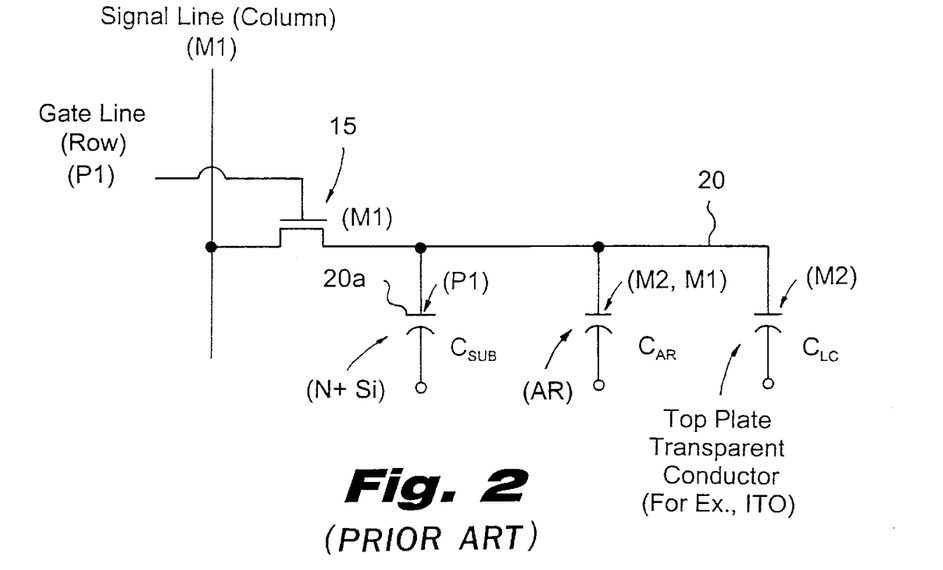
FIG. 2 illustrates the equivalent circuit of the absorbing gap cell design of FIG. 1.

FIG. 1 illustrates the physical layout of an absorbing gap cell 10, e.g., 10 μm pitch, for a LCD reflection display light valve with FIG. 2 illustrating its equivalent circuit. As shown in FIG. 2, in an active matrix array LCD display, each pixel "cell" comprises a (thin-film) transistor 15, and a capacitance 20, and other components (not shown) and, may be fabricated using well-known CMOS fabrication techniques.

With more particularity, as shown in FIGS. 1 and 2, the absorbing gap cell 10 includes the following important functional layers: a conductive "P1" layer (doped polysilicon) providing a control signal to the gate of the transistor 20 row for determining the optical properties of the cell and forming one electrode of capacitor "$C_{sub}$" and having another electrode return via the substrate; a first metal layer "M1" for carrying data signals to the source terminal of the active transistor 15; a top-surface aluminum mirror layer "M2" located beneath the liquid crystal material (not shown) and forming one electrode of the liquid crystal display capacitor element $C_{LC}$ and having a top plate electrode formed of a transparent conductor such as ITO. Additionally, as part of the fabrication of the absorbing gap cell design, there is an anti-reflecting "AR" layer which forms a capacitance $C_{AR}$ with the M2 and M1 metal layers.

Figure 3A:
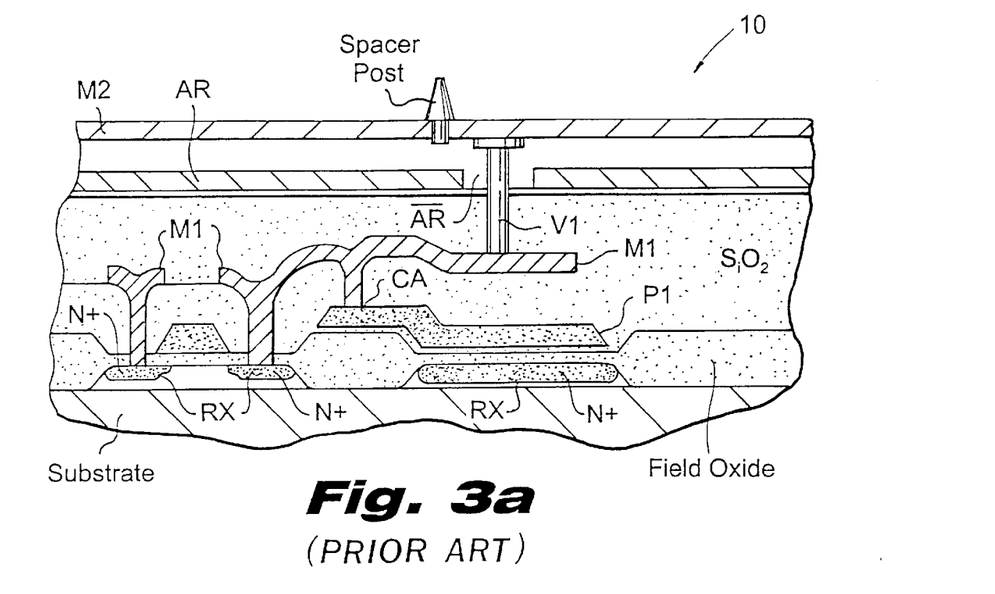
FIG. 3(a) illustrates a cross-sectional view of the absorbing gap cell of FIG. 1 taken along line X1–X1'.
Figure 3B:
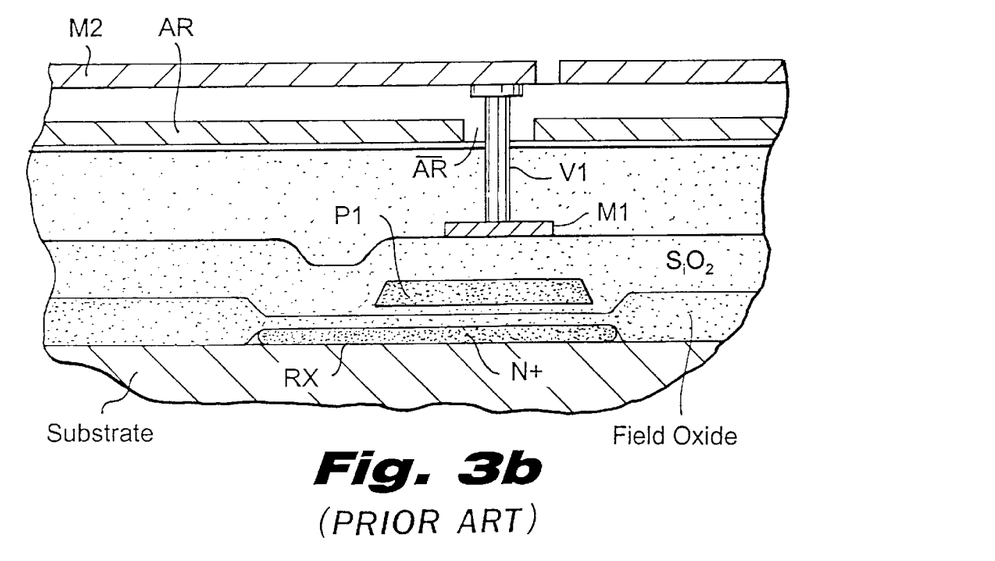
FIG. 3(b) illustrates a cross-sectional view of the absorbing gap cell of FIG. 1 taken along line Y1–Y1'.

FIG. 3(a) illustrates a cross-sectional view of the absorbing gap cell 10 of FIG. 1 taken along line X1–X1'. FIG. 3(b) illustrates a cross-sectional view of the absorbing gap cell 10 of FIG. 1 taken along line Y1–Y1'. As shown in FIGS. 3(a) and 3(b), the cell includes: regions of implanted Silicon, for example, N⁺ regions, indicated as region "RX" and forming the gate and drain/source regions for the thin-film transistor 20;

the P1 poly-Si conductive layer forming a gate for the transistor and one electrode of capacitance $C_{sub}$ with the other electrode formed of the implanted Si (RX layer); the first metallization layer M1 for carrying data control signals to the source terminal of the active transistor layer RX and providing another end of capacitor $C_{AR}$; the second metallization layer which is an light energy absorber layer "AR", e.g., formed of a tri-layer composite of titanium-nitride, aluminum, and titanium; and, the third level metallization layer M2 which is a top-surface aluminum mirror layer located beneath the liquid crystal material (not shown) and providing the liquid crystal cell with reflective optical properties. As shown in FIG. 1 and FIG. 3(a), a contact "CA" is provided for connecting the M1 layer to the P1 contact.

As further shown in FIG. 3(b), the titanium-nitride, aluminum, titanium anti-reflective or absorbing layer AR is provided between the M1 and M2 layers throughout the cell. The anti-reflective or light absorption is provided by the top titanium nitride layer, with the aluminum core layer providing the conductivity and the titanium underlayer providing the good contact and a barrier between the aluminum and the underlying $SiO_2$. This AR layer is held at the top plate electrode potential (connection not shown) and, typically is fabricated at a depth below the M2 mirror surface that is equal to an integer number of λ/(2*n) for polarized illumination oriented in the normally black mode where λ is the wavelength of the illuminating light. The aluminum mirror M2 is shown contacting the M1 metal layer underneath the AR absorbing layer by the provision of via "V1", which may be a tungsten plug, for example, connecting M1 and M2 layers. As shown in FIG. 1 and 3(a), a region AR of the AR layer is removed about the via V1 so as to electrically isolate the AR layer.

In an active matrix array comprising absorbing gap pixel cells (of c-Si technology) shown in FIG. 1, the M2 reflecting mirror surface area covers a fraction of the pixel surface area with exposed gaps "G" remaining within the cell. Disposed underlying the gaps "G" is the AR layer between the mirrors M1 and M2 that absorbs illumination energy. Thus, if the illumination directed at the cell is of high enough intensity, then optical power absorbed and heat removal from the array may be a design problem because the light valve array is typically packaged for compactness and accommodating heat sink sizes may expand the packaging, and/or require additional fan cooling which adds system weight and noise. This additionally applies to absorbing gap cells fabricated of p-Si technology which utilize a glass substrate (not shown). These problems are compounded in reducing cell pitch or incorporating binary area weighted mirrors. Thus, the prior art absorbing gap cell design exhibits a decreased aperture ratio, i.e., decreased light reflection efficiency.

It is the case then that an increase in aperture ratio is very desirable as this would reduce the illumination requirements and reduce array power absorption, thereby saving cost.

SUMMARY OF THE INVENTION

The present invention is directed to a reflection display array implementing two or more layers of reflecting front surface mirrors with upper layer mirror(s) having absorbing back surface(s). The mirror surfaces associated with each pixel are electrically connected to the pixel output electrode. The lower mirrors are appropriately positioned in the three dimensions to achieve nearly 100% aperture fill. Thus, the previous absorbing gap has been replaced with mirror(s).

Thus, according to the principles of the invention, there is provided a pixel structure for a reflective LCD display comprising a first layer of reflecting material for reflecting light directed at the cell structure in accordance with a control signal; a second layer of reflecting material disposed above the first layer of reflecting material for reflecting light directed at the cell structure in accordance with the control signal; and, a means for providing control signal to the first and second layers in said the structure for controlling amount of reflection thereof; whereby provision of the first and second layers of reflecting material results in reflective LCD display having substantially increased aperture ratio.

Advantageously, the fabrication of this multi-mirror structure for reflective array displays need not require any additional masks than that used by reflecting cell absorbing gap fabrication technique since the number of metal layers are the same.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 4:
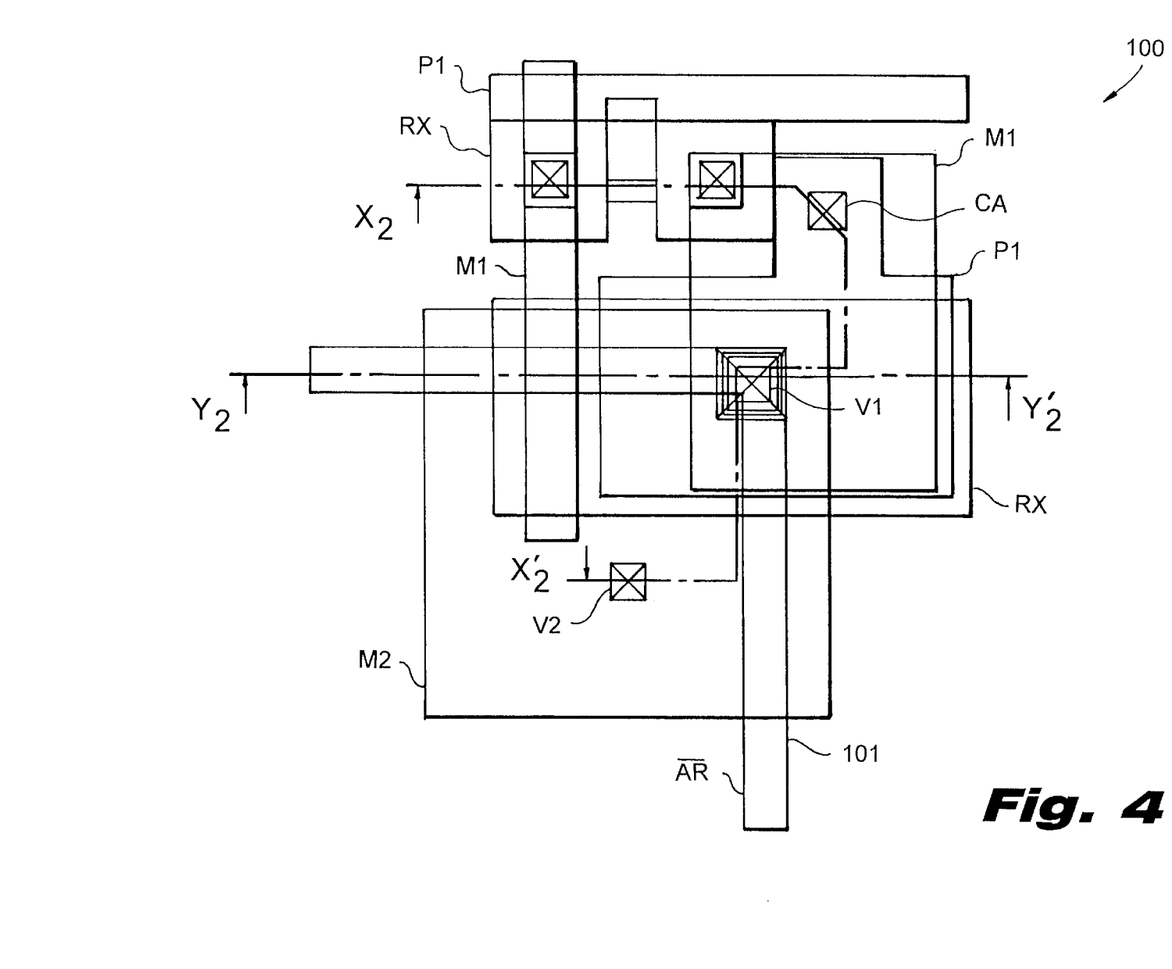
FIG. 4 illustrates the physical layout of the reflecting gap pixel cell 100 of the invention.

FIG. 4 shows the superimposed layers of the reflecting gap pixel cell 100 of the invention for a projection LCD display using, e.g., crystalline silicon (c-Si) CMOS technology. As shown, the P1, RX, M1 and M2 layers and the CA contact in the reflective cell design 100 are the same as in the absorptive cell design 10 of FIG. 1. For example, the top level mirror (M2) is patterned the same as the absorptive cell design (FIG. 1). However, according to the invention, the AR level in between the M2 and M1 layers is fabricated with reflective material, e.g., aluminum, with an underlying titanium barrier level. Thus, exposed within gaps between reflective mirrors M2 in an active matrix array is an AR level of reflective material.

Figure 6A:
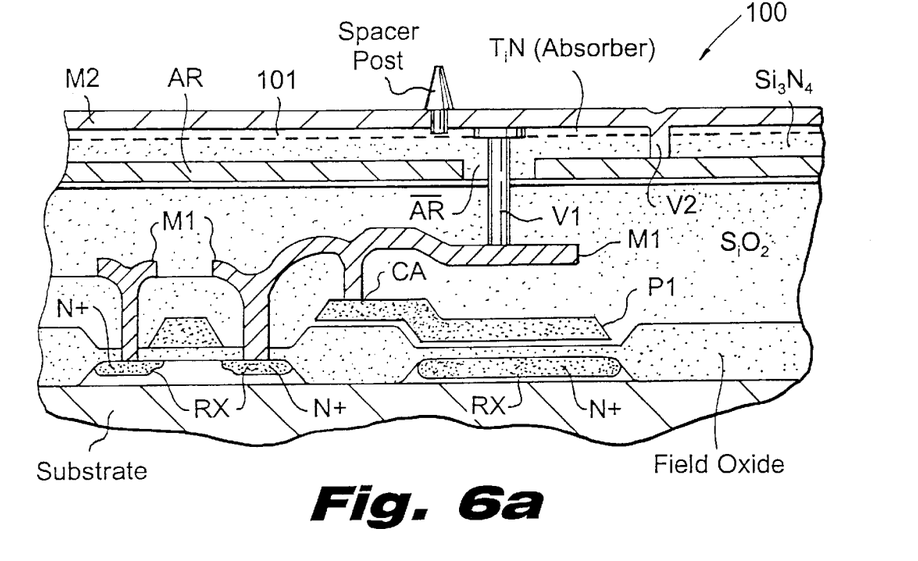
FIG. 6(a) illustrates a cross-sectional view of the reflecting gap cell 100 of FIG. 4 taken along line X2–X2'.
Figure 6B:
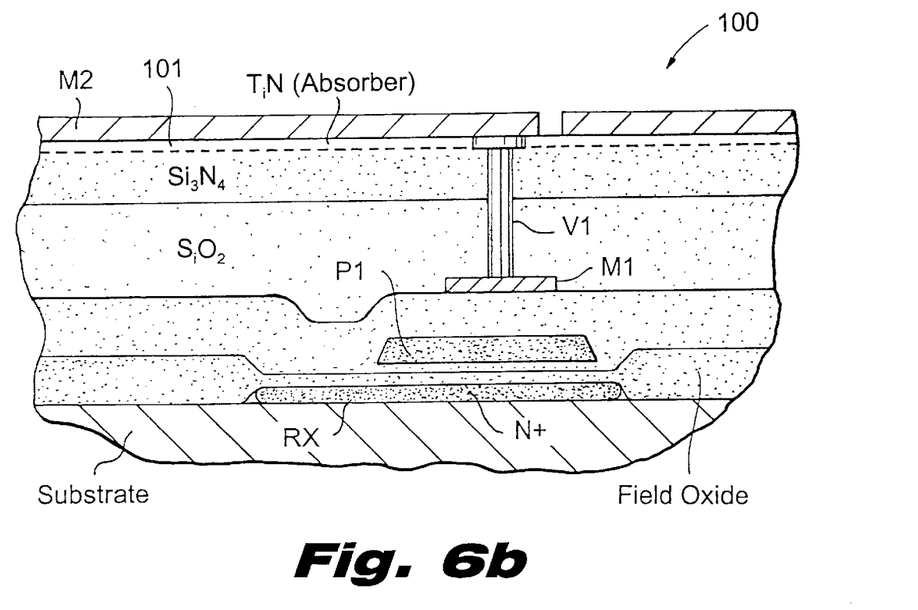
FIG. 6(b) illustrates a cross-sectional view of the reflecting gap cell 100 of FIG. 4 taken along line Y2–Y2'.

FIG. 6(a) illustrates a cross-sectional view of the reflecting gap cell 100 of FIG. 4 taken along line X2–X2' and FIG. 6(b) illustrates a cross-sectional view of the reflecting gap cell 100 of FIG. 4 taken along line Y2–Y2'. As shown in FIGS. 6(a) and 6(b), underlying the cell M2 metallization (mirror) layer is a layer 101 of absorbing material, e.g., about 50 nm of TiN (titanium-nitride). Since the illuminating light directed at the cell and entering the gap G isn't perfectly parallel, possibly due to secondary reflections from non-planar surfaces and sidewalls of, for example, the M2 layer, the underside or back surface of upper mirror(s) needs to be absorptive to keep light away from the silicon substrate. The absorbing TiN layer 101 thus functions to absorb light that is transmitted through the gaps between mirror M2 in the active matrix array and reflected from the AR or any other underlying layer in each pixel, and then reflect back upward towards the underside of M2. The non-parallel reflection may be caused, for example, by the surface roughness of the AR layer or any other layer in the light ray path. It should be understood that the $SiO_2$ layer directly beneath the AR layer may be planarized by the common chemical-mechanical polishing (Chemech) procedure.

In the preferred embodiment, the depth of the reflective mirror material at the AR level is preferably an integer number of $\lambda/(2*n)$ deep where $\lambda$ is wavelength and n is the index of refraction of the dielectric, e.g., $Si_3N_4$, separating the mirrors. The reflecting gap cell design is easily achievable with CMOS device fabrication techniques such as used to manufacture the absorbing gap cell (of FIG. 1) and does not require any additional masks. Specifically, as shown in FIG. 6(a), the titanium-nitride underlying the M2 layer is etched in the M2 gap region. The M2 layer provides the etch mask for the removal of titanium nitride in the M2 gap and thus does not require any additional photolithographic masks or steps.

More particularly, in the cross-sectional view of the absorbing gap cell of FIG. 3(a) the AR absorptive layer consists of aluminum cladded between titanium and titanium nitride. In the reflecting cell gap design of the invention, the top surface reflecting and back surface absorbing mirrors M2 may be fabricated by changing the sequence of the titanium nitride deposition. As a result, the same processes used for gap absorbing design (FIGS. 3(a)–3(b)) with the AR composed of a trilayer composite of titanium nitride, aluminum and titanium, may be used for the multi-mirror gap reflecting design (FIGS. 6(a)–6(b)) of the invention. Consequently, the reflecting gap design does not require a new process to be developed.

Figure 5:
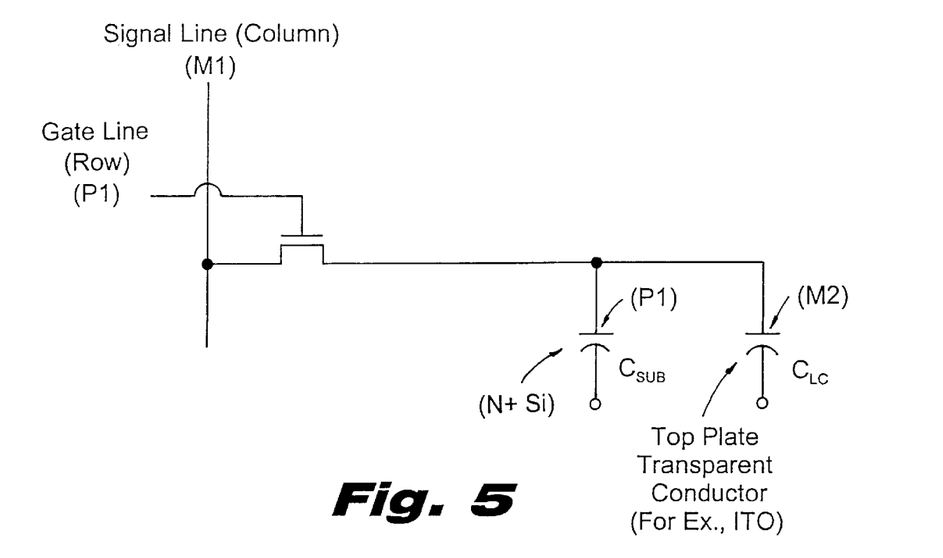
FIG. 5 illustrates the equivalent circuit of the reflecting gap cell design of FIG. 4.

In the fabrication of the reflecting LCD pixel cell 100 of FIG. 4, the AR layer must have an exposed gap since the same pattern is stepped in x and y and must have electrical isolation from adjacent pixels. To achieve the electrical isolation, an L-shaped cut 101 is designed in the AR level of reflective material level to form a region $\overline{AR}$ that electrically isolates each pixel of the array. Electrical connection for controlling light reflection at the AR level is provided by an extra via "V2" that connects the AR reflecting level with the M2 mirror layer of that pixel. FIG. 5 illustrates the equivalent circuit of the reflecting gap cell design of FIG. 4. Due to the presence of the reflecting AR layer, and its connection to the M2 layer by via V2, no additional capacitance is present between the M2 layer and the AR layer. Additionally, the tungsten plug V1 connecting M1 and M2 layers removes capacitance between M1 and AR, in effect, eliminating the prior art capacitance $C_{AR}$ in FIG. 5.

Figure 7:
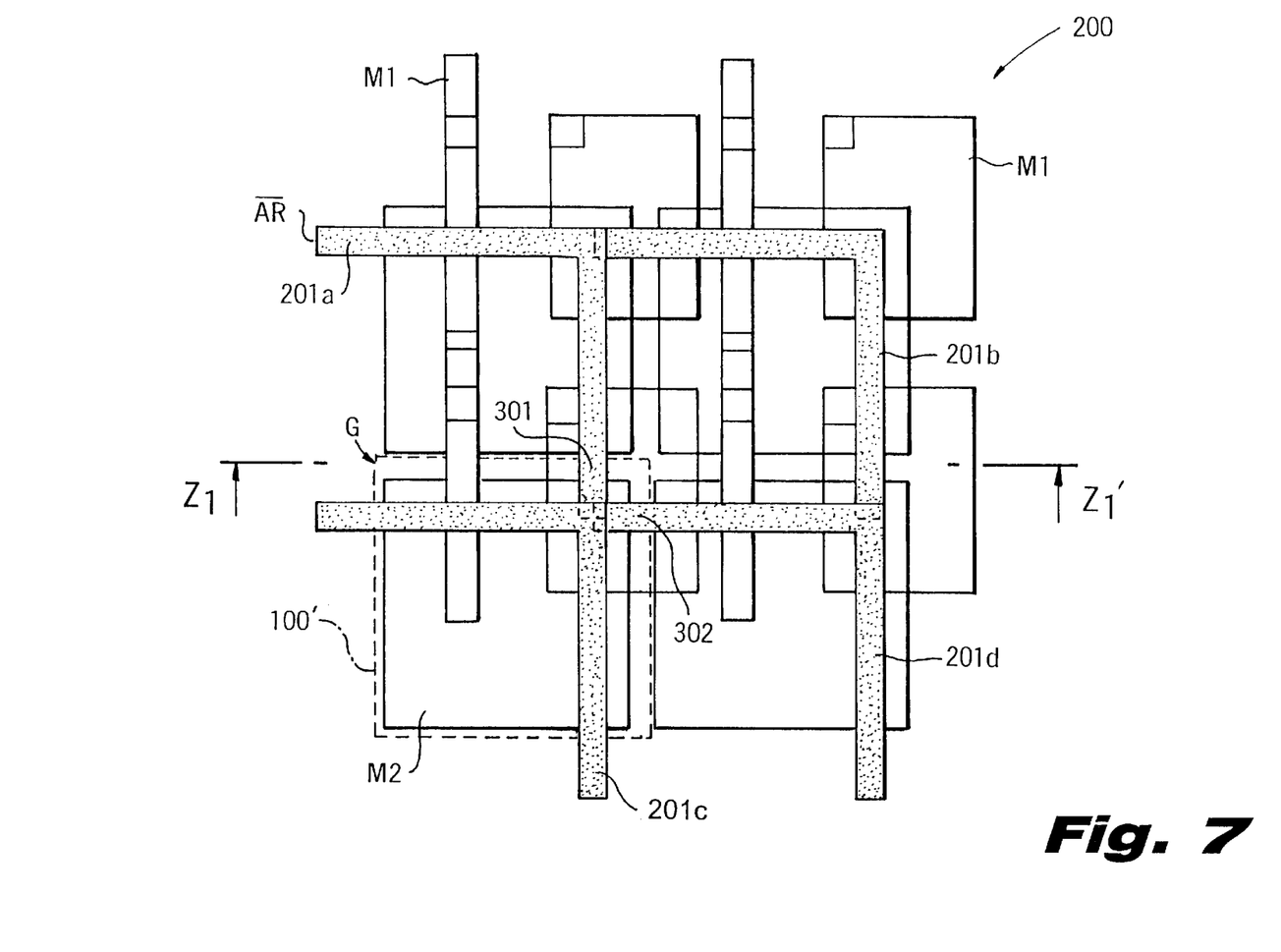
FIG. 7 illustrates a 2×2 active matrix array 200 comprising four reflecting LCD cells of FIG. 4.

FIG. 7 illustrates a 2×2 reflecting gap cell arrangement 200 having reflecting pixel cells of FIG. 4 each electrically isolated from each other by the four L-shaped AR layer cuts 201a–201d (indicated as layer $\overline{AR}$). In FIG. 7, one reflecting gap pixel 100' is shown. With respect to pixel 100', the portion 301 of the AR cut 201a as shown encircled, is exposed in the gap G between mirrors M2 of adjacent column pixels. Likewise, the portion 302 of the AR cut 201d as shown encircled, is exposed in the gap G between mirrors M2 of adjacent row pixels. All other areas within the pixel cell 100' have exposed AR reflecting layer. Thus, locations 301, 302 are the only areas within a reflecting gap LCD pixel cell that may permit light to pass through into the cell. It should be understood however that, any decrease in aperture ratio due to the presence of the $\overline{AR}$ cut portions (AR layer cuts) 301, 302 in the design is virtually inconsequential.

Figure 8:
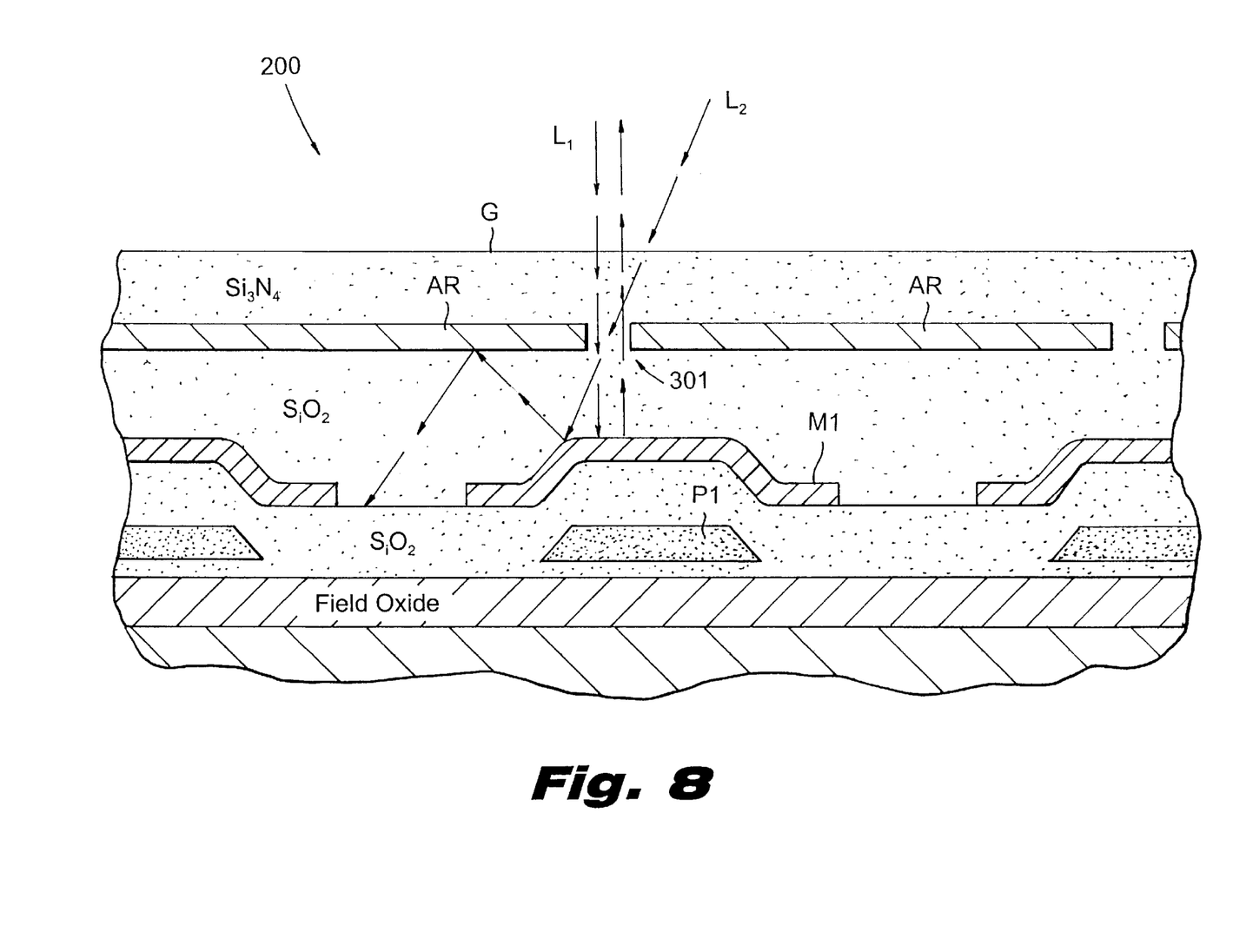
FIG. 8 illustrates a cross-sectional view of the reflecting gap cell active matrix array 200 of FIG. 7 taken along line Z1–Z1'.

FIG. 8 illustrates a cross-sectional view of the 2×2 absorbing gap cell 100 of FIG. 4 taken along line Z1–Z1' of FIG. 7. As shown in FIG. 8, there is a small area 301 where the AR layer is not continuous, i.e., the AR cut, so that illuminated light L1 may find its way, in the M2 gap G past the AR level. Only the M1 layer is left to protect the underlying c-Si circuitry. As shown in FIG. 8, the M1 has a flat topology directly underneath the AR cut, 301, but there may be a portion of the M1 layer topology that may redirect oblique light rays, e.g., light ray L2, further into the c-Si circuitry. It should be understood however, in actual designs, the light source and the resulting light rays are very perpendicular to the light valve, e.g., collimated and less than 1° angle from the perpendicular to the light valve. Thus, light ray L2 represents the only light loss (light not reflected back), which in practical light valve designs may approach zero.

The amount of M2 mirror overlap depends upon spacing between the mirror surfaces and amount of absorption per reflection. If spacing between mirrors M2 of adjacent pixels is $\lambda/n$, where $\lambda$ is the lightwave and n is the index of refraction of the dielectric, e.g., $Si_3N_4$, separating the mirrors, e.g., about $0.55 \mu m/1.9 = 0.29 \mu m$, 30% reflection off the back surface of the mirror and 0.15 N.A. illumination optics being assumed, then a 0.5 $\mu m$ mirror overlap will reduce the amplitude of the maximum angle ray on the order of more than $10^{4=l}$.

It should be understood that the principles of the invention as described herein could be readily applied to binary weighted mirror cell designs where two or more different sized mirrors per cell area is provided.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A pixel structure for a reflective LCD display comprising:
   a first layer of reflecting material for reflecting light directed at said cell structure in accordance with a pixel control signal, said first layer of a first predetermined bounded area providing a reflecting surface area smaller in area than a pixel surface area to define a surrounding exposed gap area in said cell structure, whereby an aperture ratio for said cell structure is defined in accordance with an amount of light reflected to the pixel a second a incident light;
   a second layer of reflecting material disposed in overlapping relation below said first layer of reflecting material in one-to-one correspondence therewith, said second layer being of predetermined bounded area and located below said exposed gain area for directing reflected light back through said exposed gap to thereby increase a total amount of light reflected by said cell structure; and,
   means for electrically connecting said first and second layers so to provide a common pixel voltage control signal to said first and second layers in said pixel structure for simultaneously controlling amount of reflection of both said first and second layers;
   whereby provision of said first and second layers of reflecting material results in reflective LCD display having increased aperture ratio due to said second layer filling said exposed gaT defined by said first layer.

2. The structure as claimed in claim 1, further comprising a third layer of absorbing material disposed immediately underneath said first reflecting layer for absorbing undesired reflections of light reflected from said second reflecting layer.

3. The structure as claimed in claim 2, further comprising means defining two dimensional boundary for a pixel structure, said means including a non-reflecting material located within said pixel structure and defining a surface area substantially smaller than said first and second reflecting areas of reflecting material for said pixel structure.

4. The structure as claimed in claim 1, wherein said second layer of reflecting material is disposed at a depth underneath said first layer such that light reflected from said second layer is in phase with light reflected off the first layer of reflecting material.

5. The structure as claimed in claim 1, wherein said second layer of reflecting material is disposed at a depth underneath said first layer such that light reflected from said second layer is out of phase with light reflected off the first layer of reflecting material.

6. The structure as claimed in claim 1, wherein said means for providing control signal to said first and second layers in said pixel structure comprises a semiconductor transistor and capacitor.

7. A reflecting LCD active matrix array screen display system having a plurality of independently controllable reflecting gap cell structures, each reflecting cell structure comprising:
   a first layer of reflecting material for reflecting light directed at said cell structure in accordance with a control signal, said first layer of a first predetermined bounded area providing a reflecting surface area smaller in area than a pixel surface area to define a surrounding exposed gap area in said cell structure, whereby an aperture ratio for said cell suructure is defined in accordance with an amount of light reflected to the pixel surface area incident light;
   a second layer of reflecting material disposed in overlapping relation below said first layer of reflecting material in one-to-one correspondence therewith, said second layer being of predetermined bounded area and located below said exposed gap area for directing reflected light back through said exposed gap to thereby increase a total amount of light reflected by said cell structure; and,
   means for electrically connecting said first and second layers so to provide a common pixel voltage control signal to said first and second laiyers in said pixel structure for simultaneously controlling amount of reflection of both said first and second layers;
   whereby provision of said first and second layers of reflecting material results in a reflective LCD display having increased aperature ratio due to the second layer filling the exposed gap defined by said first layer.

8. The display system as claimed in claim 7, further comprising a third layer of absorbing material disposed immediately underneath said first reflecting layer for absorbing undesired reflections of light reflected from said second layer.

9. The display system as claimed in claim 8, further comprising means defining two dimensional boundary for a pixel structure, said means including a non-reflecting material located within said pixel structure and defining a surface area substantially smaller than said first and second reflecting areas of reflecting material for said pixel structure.

10. The display system as claimed in claim 7, wherein said second layer of reflecting material is disposed at a depth underneath said first layer such that light reflected from said second layer is in phase with light reflected off the first layer of reflecting material.

11. The display system as claimed in claim 7, wherein said second layer of reflecting material is disposed at a depth underneath said first layer such that light reflected from said second layer is out of phase with light reflected off the first layer of reflecting material.

12. The display system as claimed in claim 7, wherein said means for providing control signal to said first and second layers in said pixel structure comprises a semiconductor transistor and capacitor.

* * * * *

UNITED STATES PATENT AND TRADEMARK OFFICE
CERTIFICATE OF CORRECTION

PATENT NO. : 6,181,398 B1
DATED : January 30, 2001
INVENTOR(S) : F.R. Libsch, et al.

It is certified that error appears in the above-identified patent and that said Letters Patent is hereby corrected as shown below:

Column 1,
Line 50 & 51: "The" should not begin a new paragraph.

Column 4,
Line 49 & 50: "G" should not begin a new paragraph.

Column 5, Claim 1,
Line 43, "a second a" should read -- surface area --
Line 48, "gain" should read -- gap --
Line 60, "gaT" should read -- gap --

Column 6, Claim 7,
Line 43, "laiyers" should read -- layers --
Line 47, "aperature" should read -- aperture --

Signed and Sealed this

Twenty-first Day of August, 2001

Attest:

NICHOLAS P. GODICI
Attesting Officer
*Acting Director of the United States Patent and Trademark Office*